United States Patent
Thompson et al.

(10) Patent No.: US 10,771,420 B2
(45) Date of Patent: Sep. 8, 2020

(54) CREATING AND UPDATING DIGITAL NOTES VIA ELECTRONIC MESSAGES

(71) Applicant: Microsoft Technology Licensing, LLC, Redmond, WA (US)

(72) Inventors: Eric B. Thompson, Seattle, WA (US); Nadja A. Rhodes, Seattle, WA (US); Michael E. Taron, Seattle, WA (US); Allison J. Rutherford, Seattle, WA (US); David J. Conger, Issaquah, WA (US); Abdullah Rubiyath, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 15/969,573

(22) Filed: May 2, 2018

(65) Prior Publication Data

US 2019/0342248 A1 Nov. 7, 2019

(51) Int. Cl.
*H04L 12/58* (2006.01)
*G06F 17/24* (2006.01)
*G06F 40/166* (2020.01)

(52) U.S. Cl.
CPC ............ *H04L 51/18* (2013.01); *G06F 40/166* (2020.01); *H04L 51/24* (2013.01)

(58) Field of Classification Search
CPC .......... H04L 51/18; H04L 51/24; G06F 17/24
See application file for complete search history.

(56) References Cited

U.S. PATENT DOCUMENTS

| | | | |
|---|---|---|---|
| 7,627,635 B1 | 12/2009 | Logue et al. | |
| 7,761,785 B2 | 7/2010 | Veselova et al. | |
| 8,522,130 B1 | 8/2013 | Gilead et al. | |
| 9,495,559 B2 | 11/2016 | Le Chevalier et al. | |

(Continued)

FOREIGN PATENT DOCUMENTS

| | | | |
|---|---|---|---|
| WO | 2008153566 A1 | 12/2008 | |
| WO | WO-2008153566 A1 * | 12/2008 | ........... G06F 40/284 |

OTHER PUBLICATIONS

"Mail to Self • Send notes to your email in one tap", Retrieved From: https://web.archive.org/web/20180221151851/https://itunes.apple.com/us/app/mail-to-self-send-notes-to-your-email-in-one-tap/id935527163?mt=8, Feb. 21, 2018, 3 Pages.

(Continued)

*Primary Examiner* — Soe Hlaing
(74) *Attorney, Agent, or Firm* — Michael Best & Friedrich LLP

(57) ABSTRACT

Systems and methods for creating and updating digital notes. One system includes an electronic processor configured to receive an electronic message from a user to an electronic messaging address, the electronic message including content and determine whether the electronic messaging address is associated with the user. In response to the electronic messaging address being associated with the user, the electronic processor is configured to automatically create a digital note including at least a portion of the content included in the electronic message. The electronic processor is also configured to receive a reply to the electronic message from the user and automatically update the digital note based on the reply.

19 Claims, 5 Drawing Sheets

(56) References Cited

U.S. PATENT DOCUMENTS

| | | | | |
|---|---|---|---|---|
| 2004/0243677 | A1* | 12/2004 | Curbow | G06Q 10/107 709/206 |
| 2007/0130369 | A1 | 6/2007 | Nayak | |
| 2007/0244976 | A1* | 10/2007 | Carroll | G06Q 10/107 709/206 |
| 2008/0034315 | A1 | 2/2008 | Langoulant et al. | |
| 2010/0070880 | A1* | 3/2010 | Chinta | G06F 17/241 715/752 |
| 2014/0082521 | A1 | 3/2014 | Carolan et al. | |
| 2015/0281149 | A1 | 10/2015 | Masterson et al. | |
| 2017/0118149 | A1* | 4/2017 | Gnech | H04L 51/08 |
| 2017/0161372 | A1* | 6/2017 | Fern ndez | G06F 40/268 |
| 2017/0277740 | A1* | 9/2017 | Ghotbi | H04L 51/12 |

OTHER PUBLICATIONS

"Use email to send notes to OneNote notebooks", Retrieved From: https://web.archive.org/web/20170704014709/https:/support.office.com/en-us/article/use-email-to-send-notes-to-onenote-notebooks-f513b641-ab0d-41cc-8dab-2a66f5d141e7, Jul. 4, 2017, 3 Pages.

Armijo, Jack, "How To Use Google Now's Note To Self To Simplify Your Life", Retrieved From: https://web.archive.org/web/20170501142514/http:/www.mysmartphonetutor.com/google-now-note-to-self/, May 1, 2017, 3 Pages.

Gondwana, Bron, "Email is Your Electronic Memory", Retrieved From: https://blog.fastmail.com/2018/02/14/email-is-your-electronic-memory/, Feb. 14, 2018, 3 Pages.

"International Search Report and Written Opinion Issued in PCT Application No. PCT/US2019/028594", dated Jul. 30, 2019, 11 Pages.

* cited by examiner

CREATING AND UPDATING DIGITAL NOTES VIA ELECTRONIC MESSAGES

FIELD

Embodiments described herein generally relate to methods and systems for creating and updating digital notes and, in particular, to creating and updating digital notes using electronic messages, such as electronic mail (e-mail) messages.

SUMMARY

Note-taking applications, such as OneNote® provided by Microsoft Corporation, allow users to create digital notes including text, digital ink, images, drawings, or a combination thereof. These applications provide a dedicated environment for taking notes during a meeting, creating a shopping list, or maintaining a to-do list. Users, however, often look for the least friction method when making a note. Accordingly, while using a note-taking application would provide the best environment for creating a note, convenience is most likely to win and the user may use whatever application he or she most frequently uses. For example, a user may simply create an electronic message (an e-mail message, a text message, a chat message, or the like) and send the electronic message to himself or herself as a note. Using the electronic message as a note is fast, is something that the user frequently and efficiently does, and recalling the note falls within the user's existing workflow of checking message. However, using an electronic message as a note fails to take advantage of the existing technology dedicated to taking and managing digital notes.

Thus, embodiments described herein improve existing technology by linking note-taking applications with electronic messaging applications, such that when a user sends an electronic message to himself or herself, a digital note, accessible through a note-taking application, is automatically created based on the electronic message. Furthermore, any updates or modifications to the original electronic message (such as replies) are automatically applied to the digital note. Similarly, any updates or modifications to the digital note are automatically applied to the electronic message. Thus, a user can access a current version of a note regardless of whether the user accesses the electronic message through a messaging application or accesses the digital note through a note-taking application.

For example, one embodiment provides a system for creating digital notes. The system includes an electronic processor configured to receive an electronic message including from a user to an electronic messaging address and determine whether the electronic messaging address is associated with the user. In response to the electronic messaging address being associated with the user, the electronic processor is configured to automatically create a digital note including at least a portion of the content included in the electronic message. The electronic processor is also configured to receive a reply to the electronic message from the user and automatically update the digital note based on the reply.

Yet another embodiment provides a method for creating digital notes. The method includes receiving, with an electronic processor, an electronic message including content from a user to an electronic messaging address and determining, with the electronic processor, whether the electronic messaging address is associated with the user. The method also includes, in response to the electronic messaging address being associated with the user, automatically, with the electronic processor, creating a digital note including at least a portion of the content included in the electronic message. In addition, the method includes receiving, with the electronic processor, an update to the digital note via a note-taking application and automatically, with the electronic processor, updating the content included in the electronic message based on the update to the digital note.

A further embodiment provides non-transitory computer-readable medium storing instructions that, when executed by an electronic processor, perform a set of functions. The set of functions includes receiving an electronic message from a user to an electronic messaging address, the electronic message including content and determining whether the electronic messaging address is associated with the user. The set of functions also includes, in response to the electronic messaging address being associated with the user, automatically creating a digital note including at least a portion of the content included in the electronic message and adding a link to the digital note to the electronic message. In addition, the set of functions includes receiving a reply to the electronic message from the user and automatically updating the digital note based on the reply.

DETAILED DESCRIPTION

Figure 1:
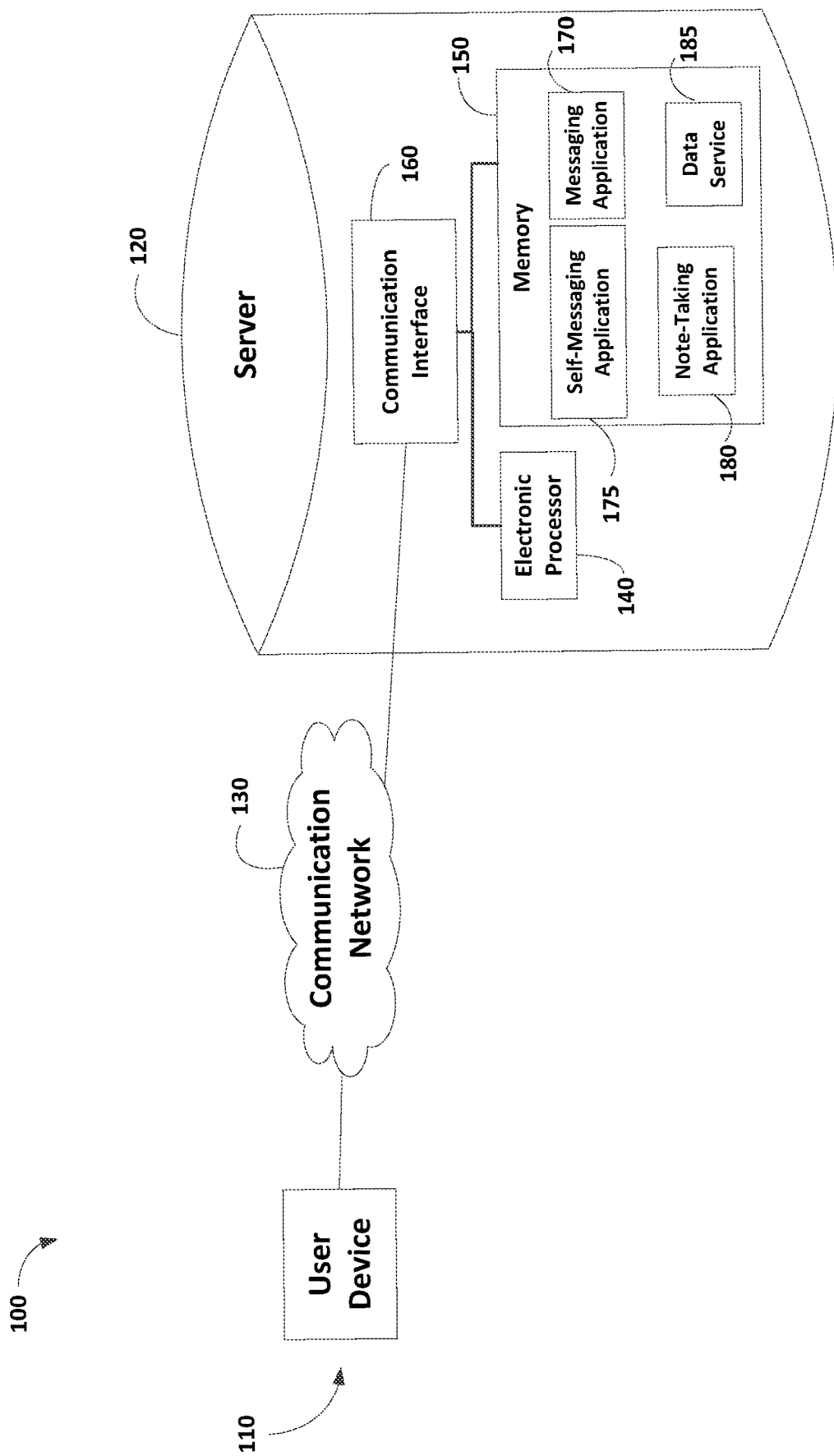
FIG. 1 schematically illustrates a system for creating digital notes according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, users may use electronic messaging services, such as e-mail, to send notes or to themselves rather than using a dedicated note-taking application. Although this process may allow a user to quickly and efficiently generate a note (especially when the user more frequently uses a messaging service than a note-taking application), this process has several disadvantages. For example, unlike note-taking applications, messaging services are not dedicated to notes and, thus, the user does not have access to the same tools and functionality for managing notes within the messaging service. Also, when a note is included in an electronic message, it is difficult to update the note except through replying to the original message, which creates multiple messages that may conflict. Furthermore, given the number of electronic messages a particular user may receive, notes may be quickly lost among other messages. Accordingly, embodiments described herein allow users to generate a digital note accessible through a note-taking application through the sending of an electronic message. A bi-directional link is also generated between the electronic message and the digital note such that updates to electronic message are applied to the digital note and vice versa.

FIG. 1 schematically illustrates a system 100 for creating digital notes. The system 100 includes at least one user device 110 (individually referred to herein as a "user device 110" or collectively referred to herein as "user devices 110") and a server 120. The user device 110 communicates with the server 120 via a communication network 130. It should be understood that the system 100 may include additional components than those illustrated in FIG. 1 in various configurations. For example, although only one user device 110 is illustrated in FIG. 1 as one example configuration of the system 100, many more devices may interact with the server 120. Furthermore, the server 120 may include any number of servers organized in various configurations, including a set of servers providing cloud-based services.

Also, a user device 110 may communicate with the server 120 over additional communication networks 130 or a network different from the communication network 130 used by a different user device 110. In addition, in some embodiments, a user device 110 communicates with the server 120 over the communication network 130 via one or more intermediary devices, including, for example, firewalls, gateways, routers, and the like.

The communication network 130 illustrated in FIG. 1 can include wired networks, wireless networks, or a combination thereof that enable communications between the various entities in the system 100. In some configurations, the communication network 130 includes cable networks, the Internet, local area networks (LANs), wide area networks (WAN), mobile telephone networks (MTNs), and other types of networks, possibly used in conjunction with one another, to facilitate communication between the user device 110 and the server 120.

As illustrated in FIG. 1, the server 120 includes an electronic processor 140, a memory 150, and a communication interface 160. The electronic processor 140, the memory 150, and the communication interface 160 communicate wirelessly, over one or more wired communication channels or busses, or a combination thereof. The memory 150 includes non-transitory, computer-readable medium, such as random access memory, read-only memory, or a combination thereof. The electronic processor 140 can include a microprocessor configured to execute instructions stored in the memory 150. The memory 150 can also store data used with and generated by execution of the instructions. The communication interface 160 allows the server 120 to communicate with external networks and devices, including the communication network 130. For example, the communication interface 160 may include a wireless transceiver for communicating with the communication network 130. It should be understood that the server 120 may include additional components than those listed in FIG. 1 in various configurations. For example, in some embodiments, the server 120 includes a plurality of electronic processors, a plurality of memories, a plurality of communication interfaces, or a combination thereof. As also noted above, the functionality described herein as being performed by the server 120 may be distributed over multiple servers, such as servers operated within a cloud environment. Furthermore, in some embodiments, functionality described herein as being performed by the server 120 may be performed locally at the user device 110.

The server 120 provides a variety of services to the user device 110. One of these services includes a messaging service. For example, as illustrated in FIG. 1, the memory 150 included in the server 120 stores a messaging application 170. The messaging application 170 (as executed by the electronic processor 140) allows a user (via the user device 110) to send and receive (access and view) electronic messages. As used in the present application, "electronic messages" include e-mail messages, text messages, instant messages, chat messages, or other messages communicated electronically. For example, in some embodiments, the messaging application 170 includes Exchange® provided by Microsoft Corporation, which allows users to send and receive e-mail messages.

The server 120 may also provide a note-taking service. For example, as illustrated in FIG. 1, the memory 150 of the server 120 may also store a note-taking application 180. The note-taking application 180 is configured to generate and manage digital notes, which may include text, digital ink, images, drawings, graphs, charts, tables, file attachments, or combinations thereof. For example, the note-taking application 180 may be OneNote®, StickyNotes™, or Microsoft To-Do™ provided by Microsoft Corporation, notes and tasks provided within Outlook® provided by Microsoft Corporation, Wunderlist® provided by Wunderkinder GmbH, or the like.

As illustrated in FIG. 1, the memory 150 also stores a self-messaging application 175. As described in more detail below, the self-messaging application 175 (as executed by the electronic processor 140) identifies electronic messages sent by a user to himself or herself via the messaging application 170 and creates (or updates) a digital note accessible through the note-taking application 180 based on the electronic message.

The memory 150 of the server 120 also stores a data service 185. The data service 185 provides an access point for services and applications provided by the server 120, such as, for example, Microsoft Graph® provided by Microsoft Corporation. As described in more detail below, the data service 185 may allow the messaging application 170, the self-messaging application 175, and the note-taking application 180 to communicate. It should be understood that, in some embodiments, one or all of these applications 170, 175, and 180 communicate directly. Accordingly, the data service 185 may be optional in some embodiments.

Figure 2:
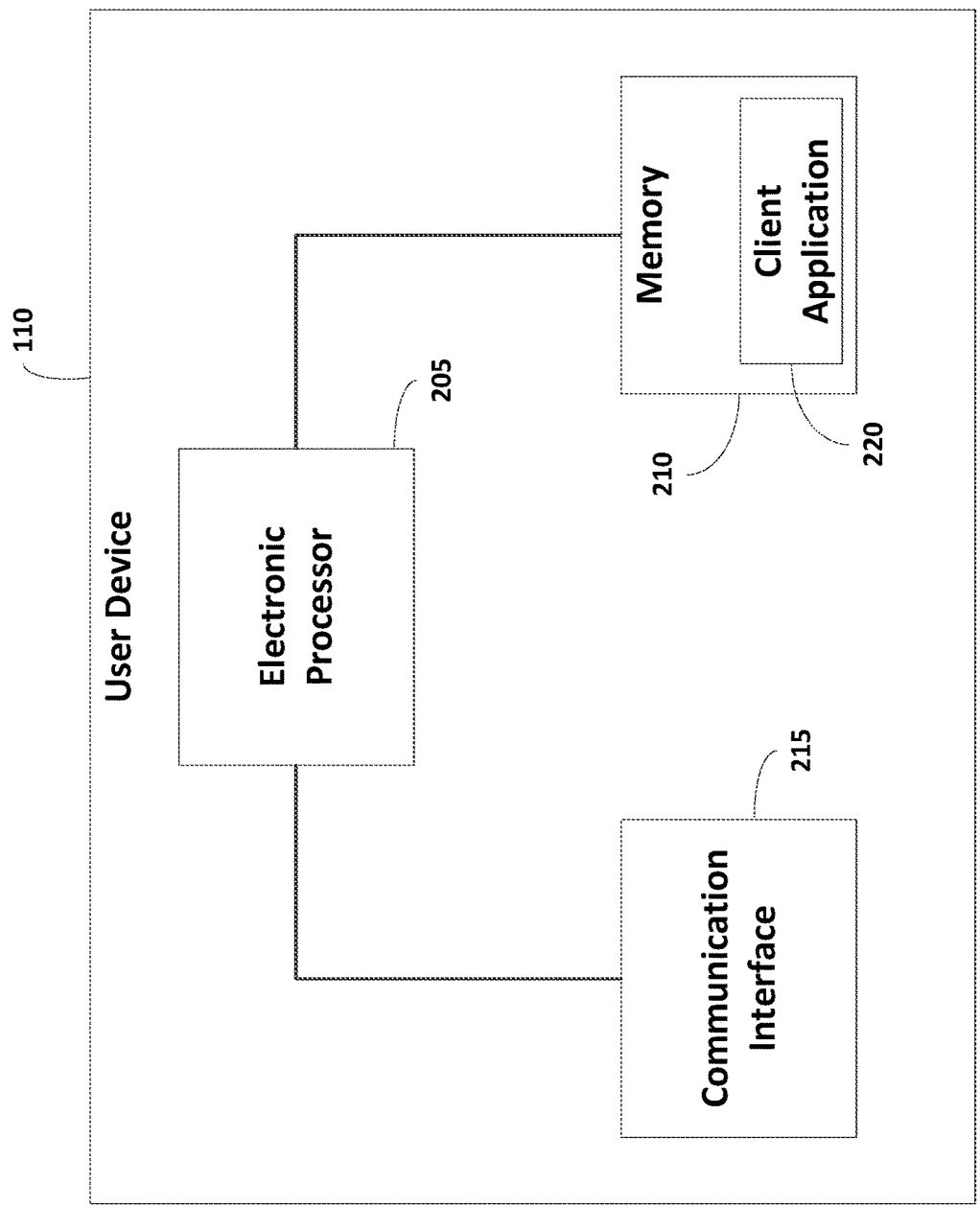
FIG. 2 schematically illustrates a user device included in the system of FIG. 1 according to one embodiment.

The user device 110 accesses the server 120 (via the communication network 130) to use one or more of the services provided by the server 120. The user device 110 may be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (for example, a smart watch, electronic "smart" glasses, a fitness tracker, or the like), or any other electronic device that can transmit and receive data over one or more networks. As illustrated in FIG. 2, the user device 110 may include an electronic processor 205, a computer-readable memory 210, and a communication interface 215 similar to the electronic processor 140, the memory 150, and the communication interface 160 as described above with respect to the server 120. As illustrated in FIG. 2, the memory 210 included in the user device 110 stores a client application 220. The client application 220, as executed by the electronic processor 205, allows a user to access the services provided by the server 120. In some configurations, the client application 220 includes a dedicated application for communicating with the server 120 and accessing the services, such as, for example, Outlook® provided by Microsoft Corporation. Alternatively, the client application 220 may include a web browser (for example, Internet Explorer® provided by Microsoft Corporation) that allows the user device 110 to access the services provided by the server 120. It should be understood that the user device 110 may include additional components in various configurations than as illustrated in FIG. 2. For example, the user device 110 may include one or more human machine interfaces, such as a display device (a touchscreen), a cursor-controlled device, a keyboard, a speaker, a microphone, or the like.

As described above, a user can use the user device 110 to generate and send an electronic message to himself or herself as a short-cut for generating a note, and these electronic messages are referred to herein as "messages-to-self." The server 120 (via the self-messaging application 175) is configured to identify messages-to-self and automatically create a new digital note or update an existing digital note based on each message-to-self. The server 120 also links a message-to-self and the associated digital note to allow for bi-directional sharing of updates.

Figure 3:
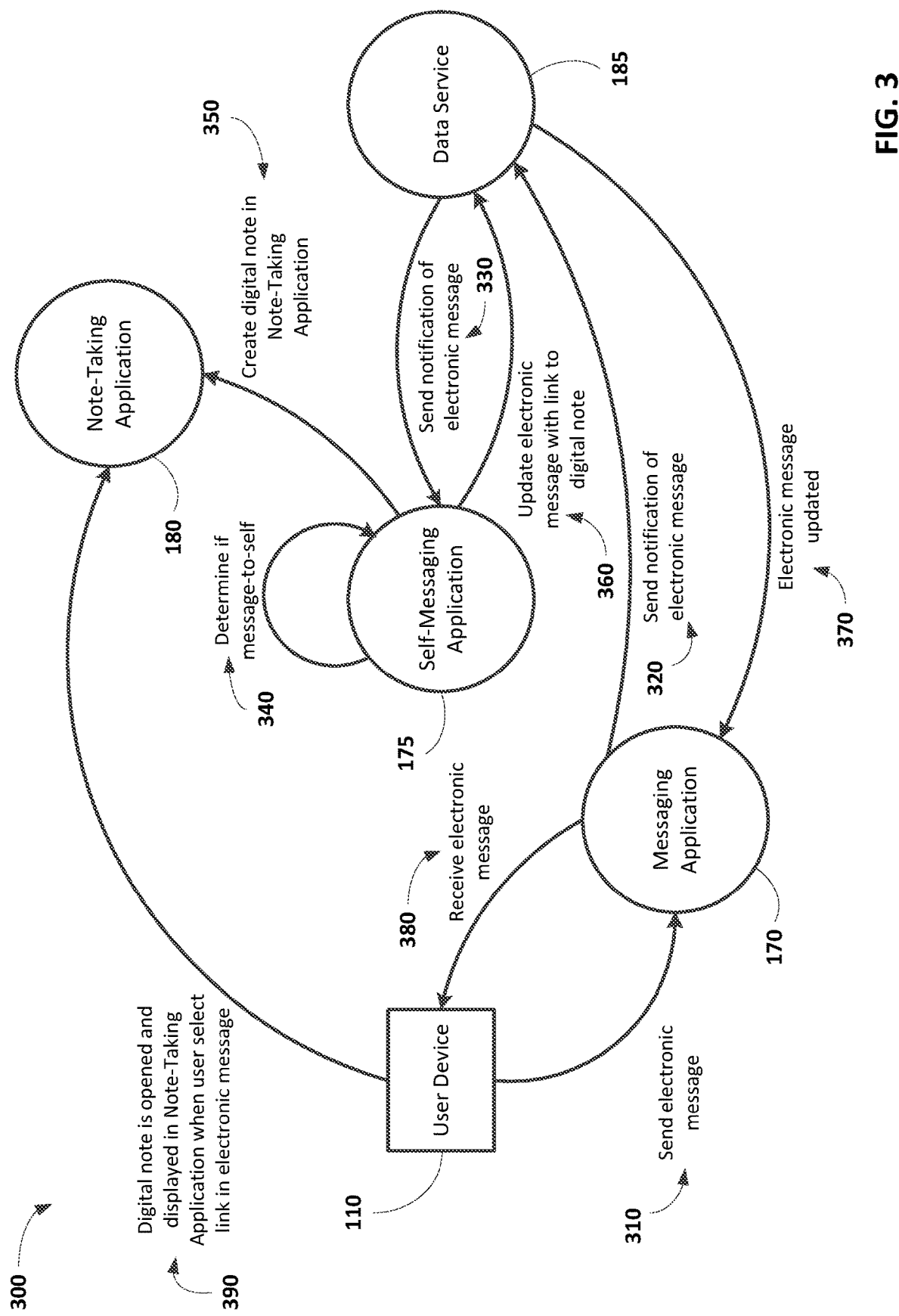
FIG. 3 is a data flow diagram illustrating a method of creating a digital note based on an electronic message performed by the system of FIG. 1 according to one embodiment.

For example, FIG. 3 is a data flow diagram illustrating a method 300 for creating a digital note based on an electronic message according to one embodiment. The method 300 is described as being performed by the server 120 and, in particular, the electronic processor 140 executing one or more applications. However, as noted above, the functionality performed by the server 120 or a portion thereof may be distributed over multiple servers, performed locally by the user device 110, or a combination thereof.

As illustrated in FIG. 3, the method 300 starts when a user of the user device 110 creates and sends an electronic message (for example, sending a text message or an e-mail message) to himself or herself (at 310). For example, assume a user has an e-mail account with the e-mail address "user@workemail.com." The user may compose an e-mail message within the client application 220 using this account and may address the e-mail message to the same e-mail address or another e-mail address of the user. For example, the user may address the e-mail message to "user@workemail.com" or to "user@personalemail.com," which may be a personal e-mail account of the user as compared to the user's work e-mail account. As noted above, embodiments described herein are not limited to e-mail messages and the electronic message sent by the user may include other types of electronic messages.

The messaging application 170 receives the electronic message and sends a notification of the electronic message to the data service 185 (at 320). The notification informs the data service 185 that a user has sent an electronic message. The notification may include the entire electronic message as sent or portions or metadata thereof. For example, the notification may include an identifier of the user (account identifier, address, or the like), the intended recipient(s) (address of each recipient) of the electronic message, the electronic message itself (or a link to the message), any attachments of the electronic message (or a link to the attachments), or a combination thereof.

The data service 185 sends the notification to the self-messaging application 175 (at 330). The data service 185 may send the notification to the self-messaging application 175 as received from the messaging application 170. However, in other embodiments, the data service 185 may modify the notification as received from the messaging application 170 before forwarding the notification to the self-messaging application 175. For example, the data service 185 may be configured to reformat the notification, add additional data to the notification, or the like. Accordingly, the messaging application 170 may be configured to notify the data service 185 of particular activities, such as transmission of new electronic messages, and the self-messaging application 175 can subscribe to such notifications through the data service 185. As noted above, in some embodiments, the messaging application 170 may directly communicate with the self-messaging application 175 without using the data service 185 as an intermediary. Also, in some embodiments, the functionality performed by the self-messaging application 175 may be performed by the messaging application 170, which may eliminate the need for the data services 185.

Based on the received notification, the self-messaging application 175 determines if the electronic message is a message-to-self (at 340). For example, using the identifier of the user who sent the electronic message, the self-messaging application 175 may access a set of messaging addresses associated with the user, which may be stored in a look-up table or similar data structure. The set of messaging addresses may include one or more e-mail addresses, phone numbers, usernames, account or profile identifiers, or a combination thereof. In some embodiments, the self-messaging application 175 automatically generates the set of messaging addresses based on user information accessible to the server 120. For example, a user's e-mail account may list other e-mail addresses, phone numbers, or the like. Similarly, the self-messaging application 175 may be configured to compare names or other identifiers between various accounts or profiles used to interact with one or more services provided via the server 120 or other servers to identify messaging addresses associated with the same user.

In some embodiments, a user can access the set of messaging addresses used by the self-messaging application 175 to confirm addresses and edit, add, or remove addresses. Also, in some embodiments, one or more messaging addresses included in the set may be addresses associated with other, different users. For example, a parent may add a child's e-mail address to the set of "associated" messaging addresses to allow e-mails sent to the child to appear as notes for the parent. Similarly, an assistant may add a manager's e-mail address to the set of "associated" messaging addresses to allow e-mails sent to the manger to appear as notes for the assistant. Regardless of how the set of messaging addresses are generated or managed for a user, the self-messaging application 175 compares each recipient address in the electronic message (as specified in the notification) to the set of messaging addresses to identify whether there is a match.

When there is not a match, the self-messaging application 175 may take no further action. However, when there is a match, the self-messaging application 175 automatically creates a new digital note via the note-taking application 180 (at 350). The new digital note includes at least a portion of the content included in the electronic message, which may include content in the body of the electronic message, content in a subject line of the electronic message, content in an attachment of the electronic message, or a combination thereof. For example, when the body of the electronic message includes the text "Provide feedback for draft advertisement" and has a copy of the referenced advertisement as an attachment, the self-messaging application 175 may be configured to create a digital note that includes the content of the body of the electronic message and a copy of the advertisement. In some embodiments, the digital note may include a link to an attachment, an image, or other object included in the electronic message rather than or in addition to including this content in the digital note. In some embodiments, the user may be informed of the new digital note, such as by a notification generated by the note-taking application 180, the appearance of a new digital sticky note within the note-taking application 180 or a separate user interface, or a combination thereof. In some embodiments, the self-messaging application 175 also adds a link to the digital note to the electronic message that triggered the generation of the digital note, such that a user can select the link from within the digital note (as displayed within the note-taking application 180) to access the corresponding electronic message. The self-messaging application 175 may generate the link based on the notification generated by the messaging application 170.

The self-messaging application 175 also provides a link to the newly-created digital note to the data service 185 (at 360). The data service 185 provides the link to the messaging application 170 for addition to the original electronic message (at 370). Accordingly, when the user receives the message-to-self (at 380), the user can select the link included in the electronic message to view the digital note within the note-taking application 180 (at 390). The link may be added (by the self-messaging application 175, the data service 185, the messaging application 170, or a combination thereof) to the body of the message-to-self. The link may also be associated with text describing the purpose of the link and informing the user that a digital note was created based on the electronic message. In some embodiments, the link (and optional explanatory text) is provided along with the original content of the electronic message. However, in other embodiments, the link (and optional explanatory text) replaces the original content of the electronic message. In some embodiments, a user can configure how a link is added to a message-to-self. Also, in some embodiments, identified messages-to-self may also be marked (with a color, icon, flag, font, or the like) within the client application 220, such as within a user's inbox, to distinguish these types of messages from other messages received by the user from other users or entities.

It should be understood that the self-messaging application 175 may be configured to detect messages-to-self based on other or additional triggers or conditions than comparing messaging addresses as described above. For example, in some embodiments, a user may include a particular keyword, phrase, or data structure (such as a bulleted list) in an electronic message to manually mark the message as a message-to-self. For example, when a user creates an e-mail message with the subject line "Note to Self" (or permutations thereof), the self-messaging application 175 may be configured to identify this message as a message-to-self (without having to compare messaging addresses). Similarly, if a user sends a message without designating a recipient for the message, the message may be marked as a message-to-self. In addition, the client application 220 may be configured to include a selection mechanism (a radio or checkbox) selectable by a user to manually mark an electronic message as a message-to-self.

After a digital note is created by the self-messaging application 175, the user may update the digital note or send a reply to the original electronic message (another message-to-self). For example, if a user initially sends a message-to-self with four items on a grocery list and later remembers that he or she needs an additional two items, the user may reply to the original message-to-self with the two additional items or may directly update the digital note created based on the original message-to-self. However, if a user makes an update to the digital note but subsequently accesses the original message-to-self at the grocery store, the user may forget about the additional two items that were not included in the original message-to-self. Accordingly, as described below with respect to FIGS. 4 and 5, the server 120 may maintain a link between a message-to-self and the associated digital note (created per the method 300 described above) to allow for bi-directional updates.

Figure 4:
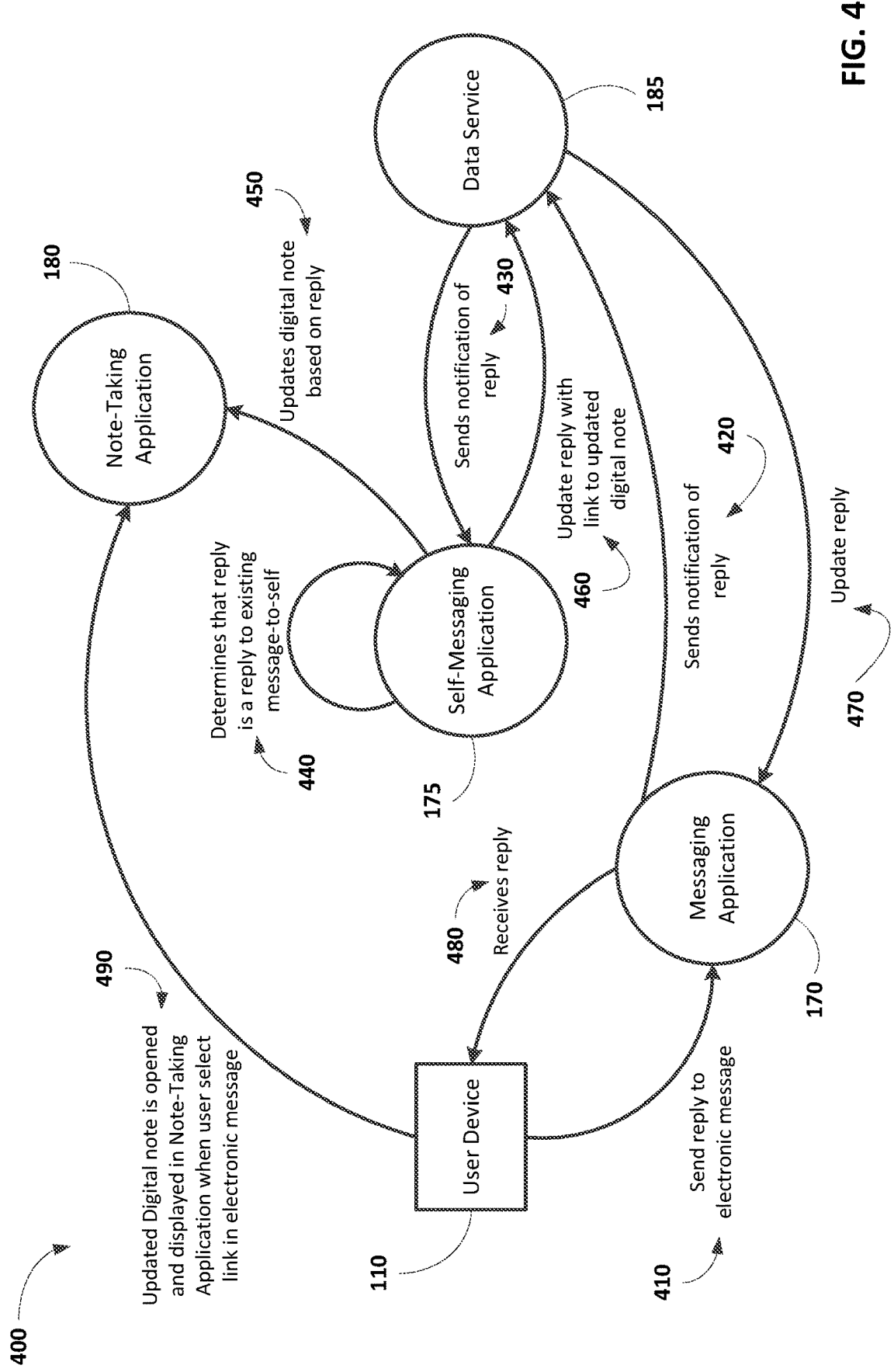
FIG. 4 is a data flow diagram illustrating a method of updating a digital note via an electronic message performed by the system of FIG. 1 according to one embodiment.

For example, FIG. 4 is a data flow diagram illustrating a method 400 of updating the digital note via an electronic message according to one embodiment. Again, method 400 is described as being performed by the server 120 and, in particular, the electronic processor 140 executing one or more applications. However, as noted above, the functionality performed by the server 120 or a portion thereof may be distributed over multiple servers, performed locally by the user device 110, or a combination thereof.

As illustrated in FIG. 4, the method 400 starts when a user of the user device 110 sends a reply to a message-to-self (at 410). As noted above, a user may reply to a message-to-self to update a previous note, such as to add items to a list, modify a date for a meeting or task, or the like. When replying to the message-to-self, the user may modify the content of the original message-to-self or add new content as the body of the reply. For the purposes of this application, both of these modifications are considered "updates" to the message-to-self or the note represented by the message-to-self.

The messaging application 170 receives the reply from the user device 110 and sends a notification of the reply to the data service 185 (at 420). As described above for the method 300, the notification may include the reply or portions or metadata thereof. The data service 185 sends the notification received from the messaging application 170 to the self-messaging application 175 (at 430). As also noted above, the data services 185 may act as a relay for the notification generated by the messaging application 170 or may modify the notification received from the messaging application 170 before sending the notification to the self-messaging application 175.

Based on the received notification, the self-messaging application 175 determines whether the reply is a reply to a message-to-self and, in particular, whether the reply is to a message-to-self that has a corresponding digital note (at 440). In some embodiments, the self-messaging application 175 is configured to identify the reply as a message-to-self as described above with respect to method 300. Alternatively or in addition, the self-messaging application 175 may identify a link in the reply (in the body of the original message-to-self) that was previously added by the self-messaging application 175 to identify the reply as both a message-to-self and a message-to-self that is associated with an existing digital note. The self-messaging application 175 may similarly use the identified link to access the associated digital note and update the digital note accordingly. In some embodiments, in addition to or as an alternative to the link, the self-messaging application 175 may look for other metadata previously added to the original message-to-self to determine whether a reply is associated with an existing note. Similarly, in some embodiments, the self-messaging application 175 may track identified messages-to-self using a unique identifier for the message or message thread. Thus, the self-messaging application 175 may be configured to compare an identifier in a reply to a list of previously-processed messages-to-self to determine if there is a match.

When the reply is not a reply to a message-to-self, the self-messaging application 175 may take no further action. However, when the reply is a reply to a message-to-self, the self-messaging application 175 updates the digital note via the note-taking application 180 based on the reply (at 450). For example, the self-messaging application 175 updates the existing digital note (for example, content included therein) based on the update included in the reply (for example, as new content or modifications to existing content included in the digital note). Updating the digital note may include editing the content of the digital note, removing content from the digital note, adding content to the digital note, editing an appearance or structure of the digital note, or a combination thereof.

In some embodiments, after updating the digital note, the self-messaging application 175 updates the reply to include a link to the updated digital note. For example, the self-messaging application 175 may send the link to the data service 185 (at 460), and the data service 185 sends the link to the messaging application 170 for inclusion in the reply (at 470). In some embodiments, the link to the updated digital note is the same link that was included in the original message-to-self. However, adding the link to the reply may make it easy for the user to access the digital note without have to scroll down or otherwise locate the original message-to-self with the link. In other embodiments, the link to the updated digital note may differ from the original link. When the user receives the reply (at 480), the user can select the link to access the updated digital note within the note-taking application 180 (at 490). In some embodiments, in addition or as an alternative to a link, the self-messaging application 175 may add text to the reply indicating that the corresponding digital note was updated based on the reply. The text may also indicate that a link can be found in the original message-to-self for accessing the digital note.

Figure 5:
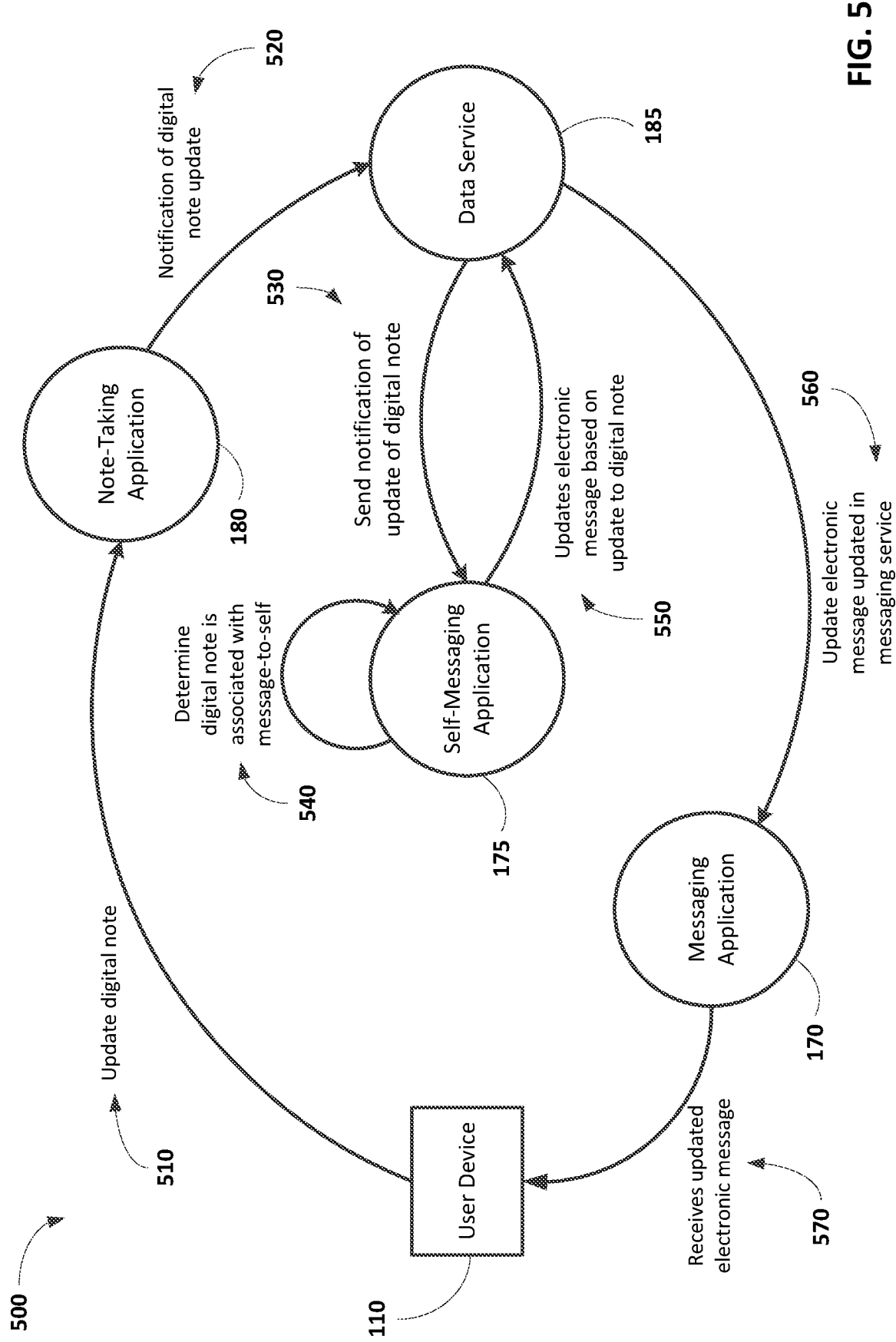
FIG. 5 is a data flow diagram illustrating a method of updating an electronic message via an update to a digital note performed by the system of FIG. 1 according to one embodiment.

Similarly, FIG. 5 is a data flow diagram illustrating a method 500 of updating an electronic message via an update to a digital note. Again, method 500 is described as being performed by the server 120 and, in particular, the electronic processor 140 executing one or more applications. However, as noted above, the functionality performed by the server 120 or a portion thereof may be distributed over multiple servers, performed locally by the user device 110, or a combination thereof.

As illustrated in FIG. 5, the method 500 starts when a user of the user device 110 updates an existing digital note via the note-taking application 180 (at 510). Updating the digital note may include adding content, removing existing content, editing existing content, editing an appearance or structure of the digital note, or a combination thereof.

After the user updates the digital note, the note-taking application 180 notifies the data service 185 of the updated digital note (at 520). The data service 185 relays the notification to the self-messaging application 175 (at 530). The notification sent by the note-taking application 180 may include the content of the digital note as updated, updates made to existing digital note, an identifier of the digital note, an identifier of the user making the update, or a combination thereof.

Based on the received notification, the self-messaging application 175 determines whether the updated digital note is associated with a message-to-self (at 540). For example, the updated digital note may be associated with a unique identifier, and the self-messaging application 175 may track identifiers of digital notes that were created based on messages-to-self. Accordingly, when the self-messaging application 175 identifies a match between an identifier associated with the updated digital note and the tracked identifiers, the self-messaging application 175 determines that the digital note is associated with a message-to-self. In some embodiments, the self-messaging application 175 also or alternatively uses a link included in the digital note to the associated message-to-self to identify that the digital note has an associated message-to-self.

When the updated digital note is not associated with a message-to-self (for example, the digital note was originally created by the user via the note-taking application 180), the self-messaging application 175 may take no further actions. However, when the updated digital note is associated with a message-to-self, the self-messaging application 175 updates the associated message-to-self via the data service 185 and the messaging application 170. For example, the self-messaging application 175 notifies the data service 185 of the update (at 550), and the data service 185 notifies the messaging application 170 of the update (at 560). The messaging application 170 updates the message-to-self by updating the content of the original message-to-self based on the update to the digital note, by generating a reply message to the original message-to-self based on the update to the digital note, or a combination thereof. Accordingly, when the user views his or her messages provided via the messaging application 170, the user sees the original message-to-self updated as the digital note was update or sees an automatically-generated reply to the original message-to-self that includes the updated content per the updated digital note. In both situations, a link may also be included in the updated message-to-self for accessing the updated digital note and, optionally, text explaining that the update to the message-to-self was based on an update to a digital note within the note-taking application 180. Accordingly, the message-to-self is kept current with respect to changes to the corresponding digital note.

In some embodiments, when a user updates a digital note, the corresponding message-to-self may no longer exist. For example, a user may delete an original message-to-self after the associated digital note is created. In these situations, the self-messaging application 175 may take no further action and, in particular, may not update any electronic messages. However, in other embodiments, the self-messaging application 175 may be configured to automatically generate a new message-to-self including the most recently-updated content included in the digital note. Similarly, when a user updates a message-to-self and the corresponding digital no longer exists (for example, the user deleted the previously-created digital note), the self-messaging application 175 may take no further action or may automatically create a new digital note based on the updated message-to-self. In some embodiments, a user can configure how the self-messaging application 175 reacts in response to identifying a deleted message-to-self or digital note.

Also, as noted above, the functionality described herein as being performed by the server 120 or portions thereof can be distributed and over multiple devices, including multiple servers in a cloud environment. Similarly, the functional described herein as being performed by the server 120 or portions thereof can be performed locally by the user device. For example, in some embodiments, the self-messaging application 175 may be included in the client application 220 and may detect messages-to-self locally. Also, in some embodiments, the note-taking application 180 may be stored and executed locally on the user device 110. Similarly, in some embodiments, the self-messaging application 175 is combined with the messaging application 170, which may eliminate the need for the data service 185.

Thus, embodiments described herein provide methods and systems for automatically creating a digital note when users send an electronic message to themselves. In addition to creating the digital note, a bi-directional link maintained between the digital note and the original electronic message, which allows updates to the digital note to be applied to electronic message and vice versa. Accordingly, users can quickly access the most current version of a note regardless of whether the user accesses the note through a messaging service or via a note-taking application.

Various features and advantages of some embodiments are set forth in the following claims.

What is claimed is:

1. A system for creating digital notes, the system comprising:
   an electronic processor configured to:
      receive an electronic message from a user to an electronic messaging address, the electronic message including content and accessible via an email application;
      determine whether the electronic messaging address is associated with the user;
      in response to the electronic messaging address being associated with the user, automatically create a digital note including at least a portion of the content included in the electronic message;
      automatically update the content of the electronic message to include a link to the digital note as received by the user, the link selectable by the user to access the digital note within a note-taking application;
      receive a reply to the electronic message from the user; and
      automatically update the digital note based on the reply.

2. The system of claim 1, wherein the electronic message includes at least one selected from a group consisting of an electronic mail address, a text message, an instant message, and a chat message.

3. The system of claim 1, wherein the electronic processor is configured determine whether the electronic messaging address is associated with the user by comparing the electronic messaging address to a set of messaging addresses associated with the user.

4. The system of claim 1, wherein the digital note includes at least one selected from a group consisting of content included in a body of the electronic message, content included in a subject line of the electronic message, and content included in an attachment to the electronic message.

5. The system of claim 1, wherein the electronic processor is further configured to include a link to the electronic message in the digital note, the link selectable by the user to access the electronic message.

6. The system of claim 1, wherein the electronic processor is further configured to, in response to receiving an update to digital note within a note-taking application, automatically update the electronic message based on the update to the digital note.

7. The system of claim 6, wherein the electronic processor is configured to automatically update the electronic message by generating a second reply to the electronic message based on the update.

8. The system of claim 6, wherein the electronic processor is configured to automatically update the electronic message by updating the content included in the electronic message based on the update.

9. The system of claim 6, wherein the electronic processor is configured to automatically update the electronic message by including an identifier in the electronic message indicating that the update was made to the digital note.

10. A method for creating digital notes, the method comprising:
    receiving, with an electronic processor, an electronic message from a user to an electronic messaging address, the electronic message including content;
    determining, with the electronic processor, whether the electronic messaging address is associated with the user;
    in response to the electronic messaging address being associated with the user, automatically, with the electronic processor, creating a digital note including at least a portion of the content included in the electronic message;
    receiving, with the electronic processor, an update to the digital note via a note-taking application, the note-taking application being separate from an electronic communication application displaying the electronic message; and automatically, with the electronic processor, updating the content included in the electronic message based on the update to the digital note.

11. The method of claim 10, wherein determining whether the electronic messaging address is associated with the user includes comparing the electronic messaging address to a set of messaging addresses associated with the user.

12. The method of claim 10, further comprising automatically updating the electronic message to include a link to the digital note, the link selectable by the user to access the digital note within the note-taking application.

13. The method of claim 10, further comprising including a link to the electronic message in the digital note, the link selectable by the user to access the electronic message.

14. The method of claim 10, further comprising
receiving a reply to the electronic message from the user; and
automatically updating the digital note based on the reply.

15. Non-transitory computer-readable medium storing instructions that, when executed by an electronic processor, perform a set of functions, the set of functions comprising:
receiving an electronic message from a user to an electronic messaging address, the electronic message including content and accessible via an email application;
determining whether the electronic messaging address is associated with the user;
in response to the electronic messaging address being associated with the user, automatically creating a digital note including at least a portion of the content included in the electronic message and adding a link to the digital note to the content of the electronic message as received by the user, the link selectable by the user to access the digital note within a note-taking application;
receiving a reply to the electronic message from the user; and
automatically updating the digital note based on the reply.

16. The non-transitory, computer-readable medium of claim 15, wherein determining whether the electronic messaging address is associated with the user includes comparing the electronic messaging address to a set of messaging addresses associated with the user.

17. The non-transitory, computer-readable medium of claim 15, wherein the set of functions further comprises, in response to receiving an update to the digital note with a note-taking application, automatically updating the electronic message based on the update to the digital note.

18. The non-transitory, computer-readable medium of claim 17, wherein automatically updating the electronic message includes generating a second reply to the electronic message based on the update.

19. The non-transitory, computer-readable medium of claim 17, wherein automatically updating the electronic message includes updating the content included in the electronic message based on the update.

* * * * *